US012627082B2

(12) United States Patent
Gebhardt et al.

(10) Patent No.: US 12,627,082 B2
(45) Date of Patent: May 12, 2026

(54) ACTUATION ELEMENT, CONNECTING ASSEMBLY, CONNECTING TERMINAL, ELECTRONIC DEVICE, AND METHOD FOR MOUNTING A CONNECTING TERMINAL

(71) Applicant: Phoenix Contact GmbH & Co. KG, Blomberg (DE)

(72) Inventors: Martin Gebhardt, Lage (DE); Karsten Nolte, Lemgo (DE); Olaf Schyrocki, Bad Pyrmont (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 335 days.

(21) Appl. No.: 18/557,299

(22) PCT Filed: Apr. 26, 2022

(86) PCT No.: PCT/EP2022/060975

§ 371 (c)(1),
(2) Date: Oct. 26, 2023

(87) PCT Pub. No.: WO2022/229139

PCT Pub. Date: Nov. 3, 2022

(65) Prior Publication Data

US 2024/0213694 A1 Jun. 27, 2024

(30) Foreign Application Priority Data

Apr. 29, 2021 (LU) ........................................ 102794

(51) Int. Cl.
*H01R 4/48* (2006.01)

(52) U.S. Cl.
CPC ......... *H01R 4/4833* (2023.08); *H01R 4/4821* (2023.08); *H01R 4/4835* (2023.08)

(58) Field of Classification Search
CPC ... H01R 4/4833; H01R 4/4835; H01R 4/4821
USPC .................................................. 439/835, 832
See application file for complete search history.

(56) References Cited

U.S. PATENT DOCUMENTS

2007/0006558 A1* 1/2007 Ramm ................. H01R 4/4835 55/385.6
2021/0273353 A1 9/2021 Ukyo
2022/0166151 A1 5/2022 Berghahn et al.
2022/0190493 A1 6/2022 Fehling et al.
2022/0247122 A1* 8/2022 Tuerkekoele ........ H01R 4/4833

(Continued)

FOREIGN PATENT DOCUMENTS

DE 102018126469 B3 3/2020
DE 102019106353 A1 9/2020
DE 102019111453 A1 11/2020

(Continued)

*Primary Examiner* — Tulsidas C Patel
*Assistant Examiner* — Thaslimur Rahman
(74) *Attorney, Agent, or Firm* — LEYDIG, VOIT & MAYER, LTD.

(57) ABSTRACT

An actuating element for actuating a clamping spring of a connection assembly includes: a first body element having a gripping surface for actuating the actuating element; and a second body element having at least one actuating surface for actuating the clamping spring. The first body element is transferrable to a pre-latched position with the second body element before being mounted in the connection assembly.

20 Claims, 9 Drawing Sheets

(56) References Cited

U.S. PATENT DOCUMENTS

| | | | | |
|---|---|---|---|---|
| 2022/0399658 | A1* | 12/2022 | Hoppmann | H01R 4/483 |

FOREIGN PATENT DOCUMENTS

| | | | | |
|---|---|---|---|---|
| DE | 102019131141 | A1 * | 5/2021 | H01R 4/483 |
| DE | 102021102477 | A1 * | 8/2022 | H01R 13/633 |
| EP | 1213792 | B1 | 12/2003 | |
| JP | H05275122 | A | 10/1993 | |
| JP | H0878067 | A | 3/1996 | |
| JP | 2001203011 | A | 7/2001 | |
| JP | 2020017515 | A | 1/2020 | |
| WO | WO 2020182639 | A1 | 9/2020 | |

* cited by examiner

ACTUATION ELEMENT, CONNECTING ASSEMBLY, CONNECTING TERMINAL, ELECTRONIC DEVICE, AND METHOD FOR MOUNTING A CONNECTING TERMINAL

CROSS-REFERENCE TO PRIOR APPLICATIONS

This application is a U.S. National Phase application under 35 U.S.C. § 371 of International Application No. PCT/EP2022/060975, filed on Apr. 26, 2022, and claims benefit to Luxembourg Patent Application No. LU 102794, filed on Apr. 29, 2021. The International Application was published in German on Nov. 3, 2022 as WO/2022/229139 under PCT Article 21(2).

FIELD

The invention relates to an actuating element for actuating a clamping spring of a connection assembly. The invention further relates to a connection assembly having such an actuating element and a connection terminal. The invention further relates to an electronic device and to a method for mounting a connection terminal.

BACKGROUND

An actuating element serves to transfer a clamping spring of a connection assembly into an open position and/or a clamping position by the actuating element interacting with a clamping leg of the clamping spring. In so doing, the actuating element has to fulfill several tasks. On the one hand, the actuating element has to have a high strength in order to apply sufficient force to the clamping spring. On the other hand, the actuating element has to have an insulating effect in order to enable the actuating element to be actuated safely by a user. In addition, the actuating element must be arranged in the correct position and with sufficiently high stability in the housing of a connection terminal.

SUMMARY

In an embodiment, the present invention provides an actuating element for actuating a clamping spring of a connection assembly, the actuating element comprising: a first body element comprising a gripping surface for actuating the actuating element; and a second body element comprising at least one actuating surface for actuating the clamping spring, wherein the first body element is transferrable to a pre-latched position with the second body element before being mounted in the connection assembly.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
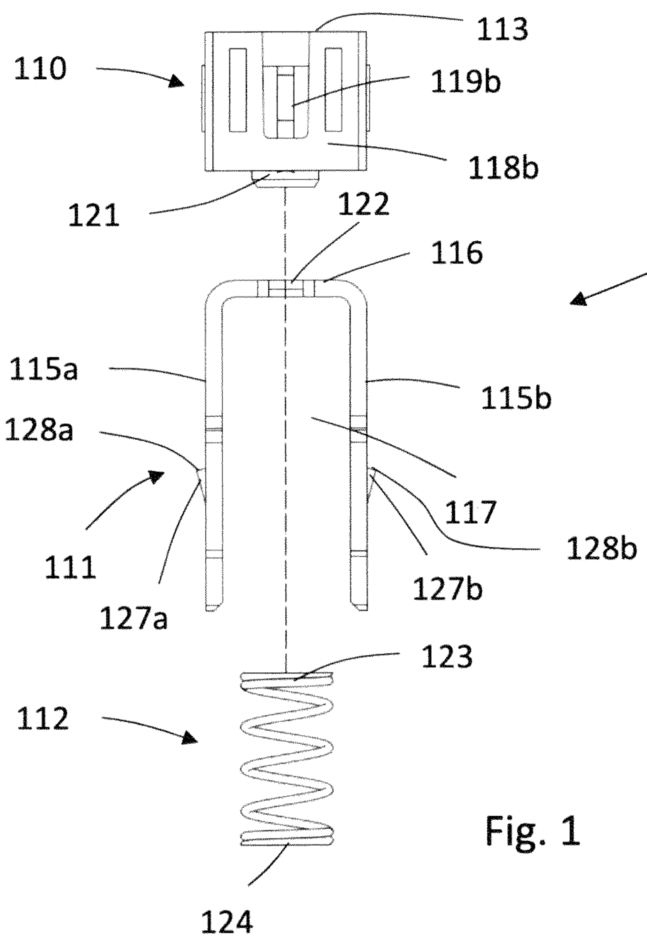
FIG. 1 shows a schematic exploded view of an actuating element according to the invention in a transverse side view.

In an embodiment, the present invention provides an actuating element, a connection assembly, a connection terminal, an electronic device, and a method for mounting a connection terminal, which is characterized by improved functionality.

The actuating element according to the invention has a first body element on which a gripping surface for actuating the actuating element is formed and a second body element on which at least one actuating surface is formed to actuate the clamping spring, wherein the first body element is transferred to a pre-latched position with the second body element before being mounted in the connection assembly.

According to the invention, the actuating element is formed from at least two components which are designed separately from one another—the first body element and the second body element. These two body elements each have a different function. The actuating element is actuated by a user via the first body element, wherein the first body element has a grip surface for this purpose. The actuating element can be actuated via the grip surface manually or by means of a tool such as a screwdriver. The second body element interacts directly with the clamping spring in order to actuate the clamping spring. For this purpose, the second body element has at least one actuating surface which rests directly against the clamping spring when the clamping spring is actuated. The first body element, on the other hand, is spaced apart from the clamping spring and is in no direct contact with the clamping spring. In order to form the actuating element, the first body element is connected to the second body element. According to the invention, a first connection of the two body elements occurs already before the actuating element is mounted in the connection assembly, and in particular before the actuating element is mounted in a housing of a connection terminal. This first connection occurs by the formation of a pre-latched position of the first body element with the second body element. The first body element is accordingly pre-latched with the second body element before further mounting the actuating element.

Due to the pre-latching, the first body element forms a locking connection with the second body element so that the first body element is fastened to the second body element via the locking connection. This locking connection is preferably releasable again if required. The connection of the two body elements therefore no longer takes place precisely when the actuating element and therefore the two body elements are inserted into the connection assembly or into the housing of the connection terminal. In contrast, the two body elements and therefore the actuating element are arranged in an already-connected state—the pre-latched position—in the connection assembly or in the housing of the connection terminal. This facilitates the mounting and therefore the handling of the actuating element and therefore also of the connection assembly or of the connection terminal.

Preferably, the first body element is made from a first material, and the second body element is made from a second material different from the first material, wherein the second material preferably has a greater strength than the first material. Due to the two different materials of the two body elements, the properties of the two body elements can be individually adapted to the particular function of the two body elements. The first body element on which the grip surface is formed can accordingly have a different material property than the second body element on which the actuating surface is formed. In particular, the two body elements can be made from materials with different strengths. The second body element can then be made from a stronger material than the first body element in order to enable a stable and defined actuation of the clamping spring via the actuating surface of the second body element.

For example, the first material of the first body element can have electrically-insulating properties. The first material can accordingly be an insulating material in order to safely form the gripping surface for actuating the actuating element for a user. The first material can be a plastic material. In contrast, the second material of the second body element can be a metal material which is characterized by a particularly high strength and stability. The second material can then have a particularly high bending stiffness in order to be able to ensure a defined actuation of the clamping spring via the actuating surface of the second body element of the actuating element. Since the second body element is not directly actuated by the user, it does not require any insulating properties.

The pre-latched position can be configured such that latching elements are formed on the first body element and/or the second body element, which can latch into corresponding openings in the first body element and/or the second body element. For example, at least one latching element may be formed on the first body element, and at least one opening may be formed in the second body element, and vice versa. The at least one latching element can hook into the at least one corresponding opening to form a latch, and accordingly the pre-latched position.

For example, to form the pre-latched position, the first body element can have two, mutually-opposing openings into which two opposing latching elements formed on the second body element can be latched. By providing two openings and two latching elements, a particularly stable and tilt-proof locking or locked position can be formed between the two body elements. However, it is also possible for the two, mutually-opposing openings to be formed in the second body element, and the two latching elements to be formed on the first body element. Furthermore, the first body element can also have, respectively, an opening and a latching element, and the second body element can have, respectively, an opening and a latching element.

The second body element can be designed such that the second body element has at least one actuating arm and a connecting web formed transversely to the actuating arm, wherein the at least one actuating surface can be formed on the at least one actuating arm, and the second body element can be pre-latched on the first body element in the pre-latched position via the connecting web. The second body element can accordingly have two functional regions which can be spatially separated from one another. The first functional region can be formed on the actuating arm in the form of the actuating surface, and the second functional region can be formed on the connecting web in the form of a fastening surface for pre-latching the second body element with the first body element. The actuating arm preferably extends at a 90° angle to the connecting web. The second body element can also have two actuating arms which can be connected to one another via the connecting web. The two actuating arms then preferably extend parallel to one another. The second body element then has a U-shape. An actuating surface for actuating the clamping spring is then preferably formed on both actuating arms so that the second body element then has two actuating surfaces which can actuate the clamping spring at the same time.

In addition to actuating the clamping spring, the actuating element can also assume a further function, viz., the holding of the actuating element in a fixed position relative to the clamping spring in the open position of the clamping spring. For this purpose, a holding contour for holding a latching leg of a clamping spring of the connection assembly in an open position of the clamping spring can be formed on the second body element of the actuating element. In addition to its clamping leg and holding leg, the clamping spring can have a latching leg which, in the open position of the clamping spring, can be held on the holding contour of the second body element. A stable metal-metal connection can, in the open position of the clamping spring, be formed between the holding contour of the second body element and the latching leg of the clamping spring when the second material of the second body element is made of a metal material.

A connection between the first body element and the second body element can additionally or alternatively be designed such that the first body element has a fastening dome which, in the pre-latched position, can be immersed in an opening formed in the second body element. The fastening dome can have the shape of a pin projecting in the direction of the second body element. For example, the opening in the second body element can have an inner diameter which is smaller than an outer diameter of the fastening dome. The fastening dome can then be fastened in the opening with a press fit. If the second body element has a connecting web, the opening is preferably formed in the connecting web.

The fastening element can, further, have a spring element. The actuating element can be spring-loaded via the spring element. The spring element can cause the actuating element to be returned to a defined, reproducible position, and in particular starting position, when the clamping spring is transferred from the open position into the clamping position. By means of the spring element, the actuating element can be spring-biased against a stop surface of the connection assembly or against a stop surface of a connection terminal, in which the connection arrangement is spring-biased. The stop surface can be formed, for example, by the current bar of the connection assembly. Furthermore, it is possible, for example, for the stop surface to be formed by a housing surface of the housing of the connection terminal. The spring element is preferably fastened to the first body element after the second body element has been pre-latched on the first body element. The spring element is thus preferably fastened to the first body element before the actuating element is mounted in the connection assembly or in the connection terminal. The spring element can, for example, be a spiral spring.

In order to make the fastening between the first body element and the second body element even more secure, the first body element can additionally be connected to the second body element by means of a force-fitting and/or integrally-bonded connection after being transferred to the pre-latched position. The pre-latching can constitute a first fastening, and, after pre-latching, a second fastening can take place. For example, in addition to pre-latching, the first body element can be connected to the second body element via a further latching connection, a rivet connection, a welded connection, an adhesive connection, and/or a screw connection.

To be able to achieve a defined starting position of the actuating element when the actuating element is returned counter to its actuating direction, the second body element can have at least one path limitation element. The at least one path limitation element can form or have a stop surface with which the second body element and accordingly the actuating element can abut against a counter stop surface when the actuating element is returned counter to its actuating direction. The counter stop surface can, for example, be formed by a wall surface of the housing of the connection terminal. Furthermore, the counter stop surface can also be formed by the current bar of the connection assembly. The at least one path limitation element can be formed on one or both actuating arms of the second body element. If the second body element has two actuating arms, a path limitation element is preferably arranged on each of the two actuating arms. The at least one path limitation element can be designed, for example, in the form of a tab or a latching lug which can be bent out of a plane of the particular actuating arm.

The object according to the invention is also achieved by means of a connection assembly for connecting an electrical conductor, which assembly has a current bar, a clamping spring which has a holding leg and a clamping leg, wherein, by means of the clamping leg, the conductor to be connected is clamped, in a clamped position of the clamping spring, against the current bar, and an actuating element which can be guided along an actuation direction and by means of which the clamping spring can be transferred from the clamping position to the open position, wherein the actuating element is designed and developed further as described above.

The actuating element formed from at least two separate components—the first body element and the second body element—is pre-latched before being mounted in the connection assembly and is accordingly premounted so that the multi-piece actuating element can be arranged and mounted in one piece in the connection assembly.

If the actuating element has a spring element in addition to the two body elements, the actuating element is preferably supported by its spring element on the current bar. The actuating element can accordingly be spring-loaded against the current bar.

Preferably, it can be provided that the actuating element, in the open position of the clamping spring, be able to be braced with its second body element with the clamping spring and be able to hold the clamping spring in the open position. Due to the braced arrangement of the actuating element with the clamping spring in the open position of the clamping spring, the actuating element can be held automatically in this position in order to hold the clamping spring in the open position. The actuating element and the clamping spring can then support one another in the open position. The actuating element and the clamping spring can thus form a self-contained force system in the open position of the clamping spring so that, in the open position of the clamping spring, the actuating element can be held in a fixed position relative to the clamping spring by the force of the clamping spring, without the actuating element having to be held manually or by means of a tool in this position. This enables simpler, and in particular one-handed, operation of the connection assembly by a user in order to be able to connect a conductor, and in particular a flexible conductor, simply and securely. As a result of the braced arrangement in the open position of the clamped position, the clamping spring and actuating element hold one another in the desired position and prevent a movement relative to one another. The clamping of the actuating element in the clamping spring with the clamping spring in the open position preferably occurs in the region of the second body element of the actuating element, which preferably has a greater strength than the first body element of the actuating element.

In order to form the bracing, the clamping spring, in the open position, can apply a first pressure force acting counter to the actuation direction of the actuating element and a second pressure force acting in the actuation direction of the actuating element to the actuating element. By means of these two, oppositely-acting pressure forces applied by the clamping spring, the actuating element can be held in the open position solely by the force of the clamping spring. Both the first pressure force and the second pressure force are applied by the clamping spring to the actuating element so that, in the open position, the actuating element can be clamped between the clamping spring or sub-portions of the clamping spring and held in a stationary manner by these two, oppositely-acting pressure forces.

According to the invention, the clamping spring can be designed in such a way that a latching leg can be arranged on the holding leg and can apply the second pressure force to the actuating element in the open position. The second pressure force is then preferably precisely not applied to the actuating element by the clamping leg or the holding leg of the clamping spring, but the clamping spring can have a third leg—the latching leg—by means of which the second pressure force can be applied to the actuating element. The latching leg can be arranged on the holding leg at an end of the holding leg remote from the clamping leg. The holding leg can thus be arranged between the clamping leg and the latching leg. The latching leg can be formed integrally with the holding leg or be connected as a separate part to the latching leg, and in particular connected to the latching leg in a form-fitting and/or force-fitting manner.

The latching leg is preferably connected resiliently to the holding leg or is formed with the holding leg so that the latching leg can be pivotable relative to the holding leg.

In order to enable, in particular, a tool-free connection of conductors with a small conductor cross-section—in particular, of flexible conductors—the latching leg can have a pressure surface, wherein, for transferring the clamping spring from the open position into the clamped position, the pressure surface can be actuated by the conductor to be connected and can be brought out of engagement with the actuating element by actuating the pressure surface of the latching legs. The latching leg can have a pressure surface which can be arranged flush with an insertion region of the conductor into the connection assembly and thus in extension of a conductor insertion opening of a housing of a connection terminal so that the conductor abuts against the pressure surface of the latching element during insertion into the connection assembly. By applying a pressure force to the pressure surface by means of the conductor, the latching leg can be put into a pivoting movement or tilting movement in the direction of the conductor insertion direction so that the latching leg can be pivoted or tilted away from the actuating element in the conductor insertion direction. As a result of the pivoting movement of the latching leg, the latching leg can be brought out of engagement with the actuating element and can thus be released from the actuating element so that the actuating element and thus the clamping spring can be transferred from the open position into the clamped position without manual assistance. By means of this special mechanism, a conductor, and in particular a conductor with a small conductor cross-section and/or a flexible conductor, can be connected in a particularly simple manner solely by the insertion movement of the conductor, without a user having to actuate further elements, such as the actuating element, on the connection assembly in order to release the clamping spring and move it from the clamped position into the open position. This facilitates the handling of the connection assembly and saves time when connecting a conductor. The bracing of the actuating element with the clamping spring in the open position of the clamping spring can thus be released or canceled by the conductor to be connected.

In order to hold the latching leg on the actuating element in the open position of the clamping spring, the actuating element can have a holding contour. The holding contour enables a secure and defined holding of the latching leg on the actuating element in the open position of the clamping spring. In the region of the holding contour, the latching leg can apply the second pressure force on the actuating element in the open position of the clamping spring. The holding contour is preferably formed in the form of a special surface shaping on the actuating element itself.

The actuating element can have a U-shape in cross-section. The actuating element can have a first actuating arm and a second actuating arm arranged at a distance from the first actuating arm, wherein the two actuating arms can be connected to each other via the connecting web. The holding contour can then be formed on the first actuating arm and on the second actuating arm. The two actuating arms are preferably oriented parallel to one another. Between the two actuating arms, a free space is formed into which the conductor to be connected is inserted and through which the conductor to be connected can be guided in the direction of the latching leg. The conductor connection space formed between the current bar and the clamping spring can be laterally delimited by the first actuating arm and the second actuating arm so that the two actuating arms can guide the conductor to be connected and prevent it from yielding laterally. The holding contour on the first actuating arm is preferably formed symmetrically to the holding contour arranged on the second actuating arm. In the open position of the clamping spring, the latching leg can be held, and in particular latched, on the two actuating arms or on the two holding contours of the two actuating arms. At its free end, the latching leg can have a T-shape, with which the latching leg can be held on the two actuating arms. As a result of the T-shape, the latching leg can have a first laterally-projecting holding arm and a second laterally-projecting holding arm, wherein the first holding arm can hold the latching leg on the holding contour of the first actuating arm, and the second holding arm can hold the latching leg on the holding contour of the second actuating arm.

In the open position, the first pressure force can be applied to the actuating element by means of the clamping leg of the clamping spring, wherein the clamping leg can have a clamping tab and at least one side tab arranged laterally of the clamping tab, wherein a clamping edge for clamping the conductor to be connected against the current bar in the clamped position can be formed on a free end of the clamping tab, and the first pressure force can be applied to the actuating element by means of the at least one side tab in the open position. The clamping leg itself can thus apply the first pressure force, which can act counter to the actuation direction of the actuating element, to the actuating element. If the latching leg is released from the bracing or latching with the actuating element, only the first pressure force applied by the clamping leg still acts upon the actuating element so that the clamping spring or the clamping leg can then automatically pivot from the open position into the clamped position as a result of this pressure force of the clamping leg in that the clamping leg can press the actuating element upwards, counter to the actuation direction. The clamping leg is preferably divided into a clamping tab and at least one, and preferably two, side tabs which can be formed laterally of the clamping tab. In the case of two side tabs, the clamping tab is arranged between the two side tabs. The two side tabs are preferably in direct contact with the actuating element so that the first pressure force can be applied to the actuating element via these two side tabs. The clamping tab is preferably not in direct contact with the actuating element, but the clamping tab is used solely to clamp the conductor against the current bar in the clamped position. The at least one side tab is preferably curved so that it can form a runner which can slide along an edge surface of the actuating element forming the actuating surface while being transferred into the open position and the clamping position.

The connection assembly is preferably designed in such a way that the actuation direction of the actuating element can be formed transversely to a conductor insertion direction of the conductor to be connected into a conductor connection space formed between the current bar and the clamping spring.

The object according to the invention is also achieved by means of a connection terminal, and in particular a terminal block, which has a housing and at least one connection assembly arranged in the housing and formed and developed as described above. A conductor insertion opening can be formed on the housing, is formed flush with the conductor connection space of the connection assembly, and the conductor to be connected can be inserted via it into the housing and into the connection assembly. Particularly in the case of a design as a terminal block which can be latched onto a support rail, two such connection assemblies can also be arranged in the housing.

Furthermore, the object according to the invention can be achieved by means of an electronic device which has at least one connection assembly formed and developed as described above and/or at least one connection terminal formed and developed as described above. The electronic device can, for example, be a switch cabinet, in which one or more support rails or mounting plates can be arranged, onto which one or more connection terminals, and in particular terminal blocks, which have corresponding connection assemblies, can be latched.

The solution to the object according to the invention can further be achieved by means of a method for mounting a connection terminal, in which a first body element of an actuating element on which a gripping surface for actuating the actuating element is formed and a second body element of the actuating element on which at least one actuating surface for actuating the clamping spring is formed are transferred to a pre-latching position with each other prior to mounting in a housing of the connection terminal.

Figure 2:
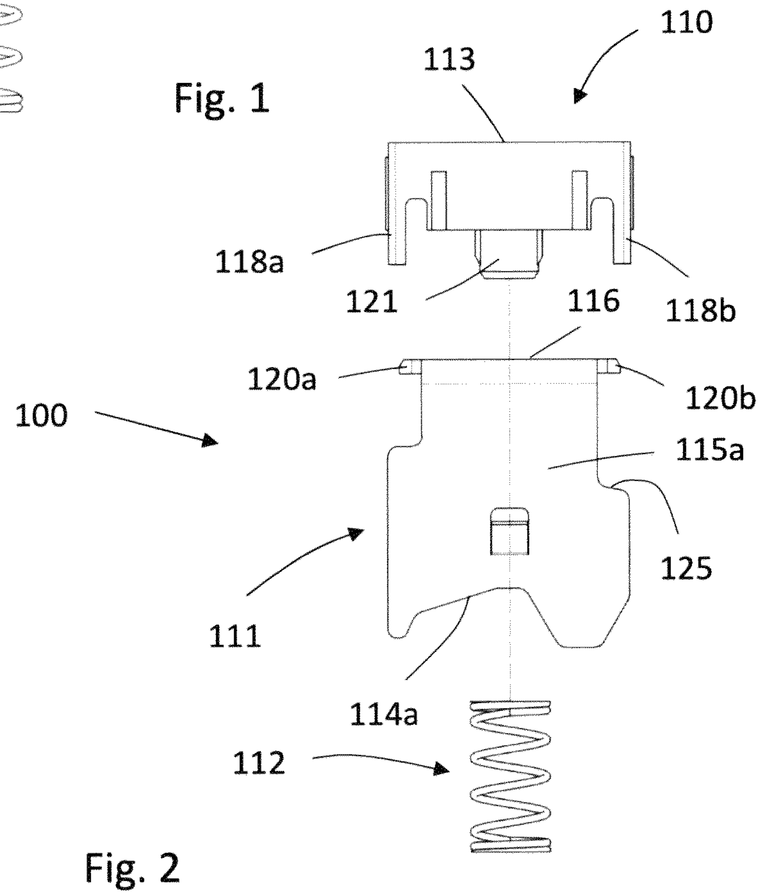
FIG. 2 shows a schematic exploded view of the actuating element shown in FIG. 1 in a longitudinal side view.

FIGS. 1 and 2 show an actuating element 100 in an exploded view. In the embodiment shown here, the actuating element 100 has a first body element 110, a second body element 111, and a spring element 112. All these three parts are individual components which are mounted and connected to one another.

The first body element 110 has a gripping surface 113 via which the actuating element 100 can be actuated manually or by means of a tool. The gripping surface 113 is formed on an outer surface of the first body element 110. For example, the gripping surface 113 can have a tool receiving region 126, e.g., in the form of a slot, into which a tool such as a screwdriver can engage.

The second body element 111 on the other hand interacts directly with the clamping spring 211 to be actuated. For this purpose, the second body element 111 has at least one actuating surface 114*a*, 114*b* for actuating the clamping spring 211. The actuating surface 114*a*, 114*b* is formed on an edge surface of the second body element 111.

The two body elements 110, 111 accordingly have two, mutually-separated functions. The actuating element 100 is actuated by a user via the first body element 110. The first body element 110 is arranged at a distance from the clamping spring 211, so that no direct contact of the first body element 110 with the clamping spring 211 is formed. In contrast, the clamping spring 211 is only in contact with the second body element.

The two body elements 110, 111 also differ from one another in their materials. The first body element 110 is made from a first material which is an insulating material, e.g., a plastic material, so that the first material of the first body element 110 is made to be electrically insulating. In contrast, the second body element 111 is made from a second material which differs in its properties from the first material of the first body element 110. The second material of the second body element 111 is a high-strength material—for example, a metal material.

As can be seen in particular in FIG. 1, in the embodiment shown here, the second body element 111 has a U-shape. The second body element 111 has two actuating arms 115*a*. 115*b*, extending parallel to one another, which are connected to one another via a connection web 116. The two actuating arms 115*a*, 115*b* each extend at a 90° angle to the connecting web 116. Each actuating arm 115*a*, 115*b* has an actuating surface 114*a*, 114*b* so that a symmetrical actuation of the clamping spring 211 via the two actuating surfaces 114*a*, 114*b* is possible.

The second body element 111 has a path limitation element 127*a*, 127*b* on its two actuating arms 115*a*, 115*b*. The path limitation elements 127*a*, 127*b* limit the actuating element 100 in its movement or in its path of movement counter to the actuating direction B when the clamping spring 211 is transferred from the open position into the clamping position.

The two path limitation elements 127*a*, 127*b* each form a stop surface 128*a*, 128*b* which can interact with a counter stop surface that can be formed on the connection assembly 200 or on the connection terminal 300. The stop surfaces 128*a*, 128*b* are each formed at a free end of the path limitation elements 127*a*, 127*b*. The stop surfaces 128*a*, 128*b* face in the direction of the first body element 110. The path limitation elements 127*a*, 127*b* are each designed in the form of a tab or latching lug bent out of the plane of the particular actuating arm 115*a*, 115*b*. The path limitation elements 127*a*, 127*b* are accordingly formed from the same material as the actuating arms 115*a*, 115.

Figure 9:
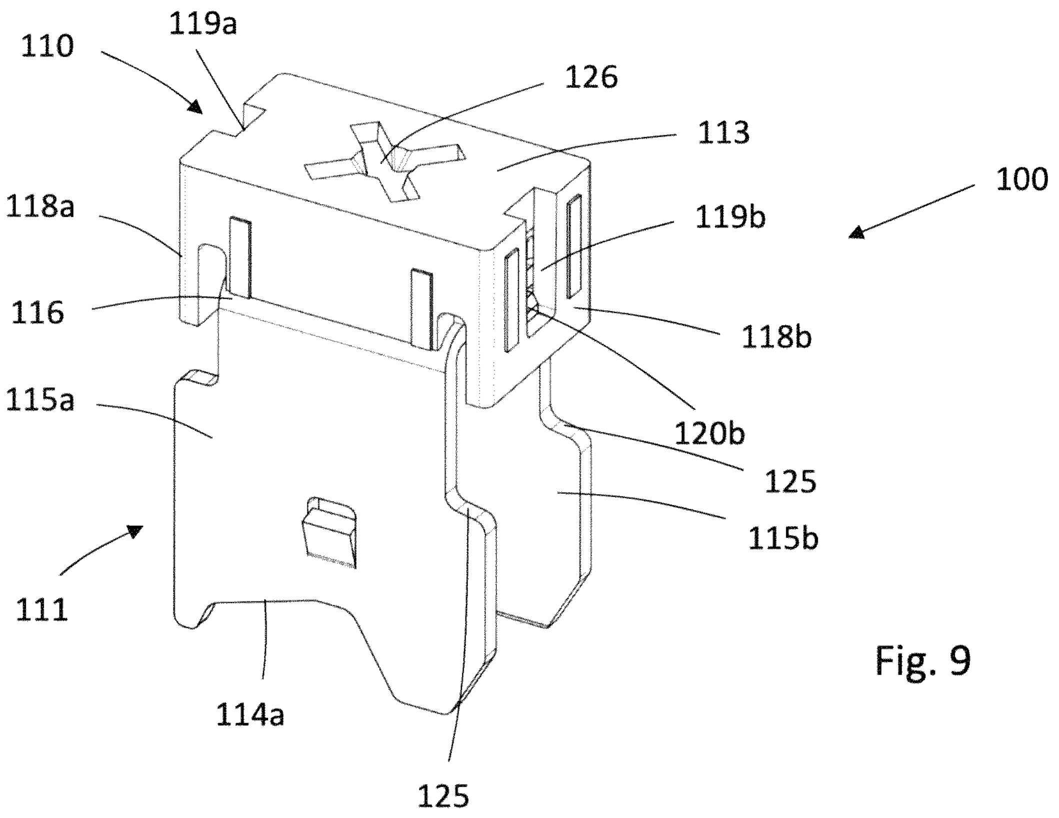
FIG. 9 shows a schematic representation of the actuating element.
Figure 10:
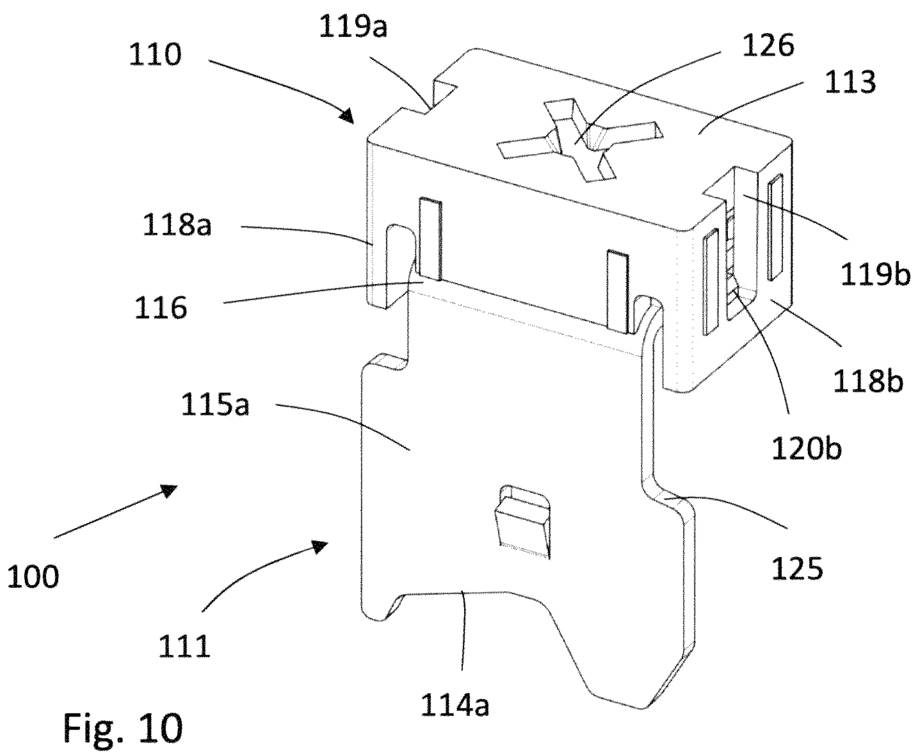
FIG. 10 shows a schematic representation of the actuating element in a further embodiment.
Figure 11:
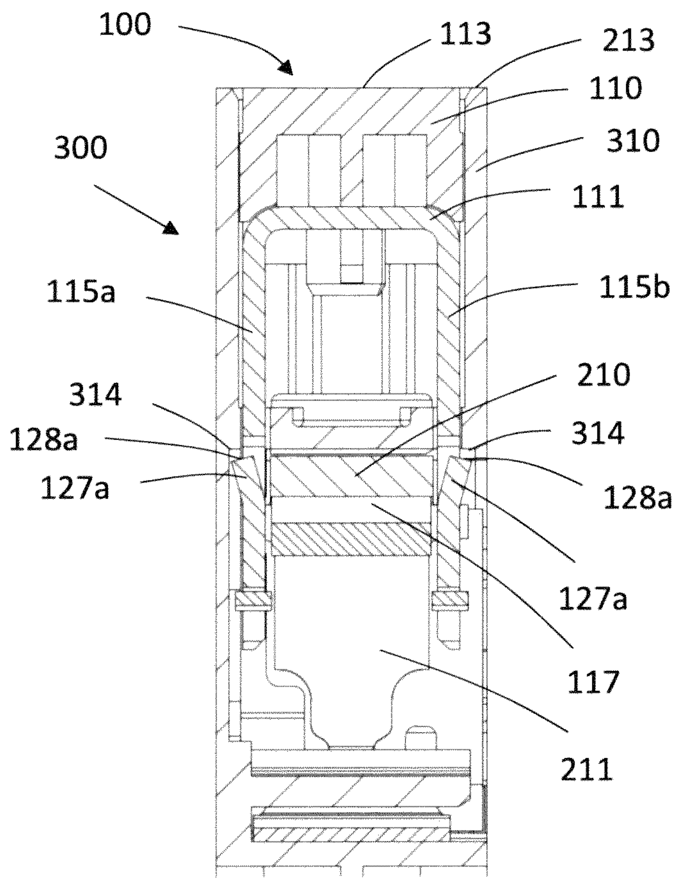
FIG. 11 shows a schematic sectional view of the connection terminal in the clamping position.

In the embodiments shown in FIGS. 1 through 11, the path limitation elements 127*a*. 127*b* are directed away from one another in that both path limitation elements 127*a*. 127*b* point away from the free space 117 formed between the two actuating arms 115*a*, 115*b*. The two path limitation elements 127*a*, 127*b* are accordingly bent outwards. In this embodiment, the counter stop surface is formed by a housing surface 314 of the housing 310 of the connection terminal 300, as can be seen in FIG. 11. The housing surface 314 is formed in this region in the form of an undercut, against which the two path limitation elements 127*a*. 127*b* can abut with their stop surfaces 128*a*, 128*b* when an initial position of the actuating element 100, as shown in FIG. 11, is reached. In this starting position, the actuating element 100 with the gripping surface 113 formed on the first body element 111 is positioned flush with the outer surface 312 of the housing 310 so that a user can visually recognize this starting position and accordingly the clamping position of the clamping spring 211 from the outside.

The path limitation elements 217*a*, 217*b* prevent the actuating element 100 from slipping out and accordingly protruding from the outer surface 312 of the housing 310. The path limitation elements 217*a*. 217*b* therefore allow the initial position to represent a defined and reproducible position of the actuating element 100.

Figure 12:
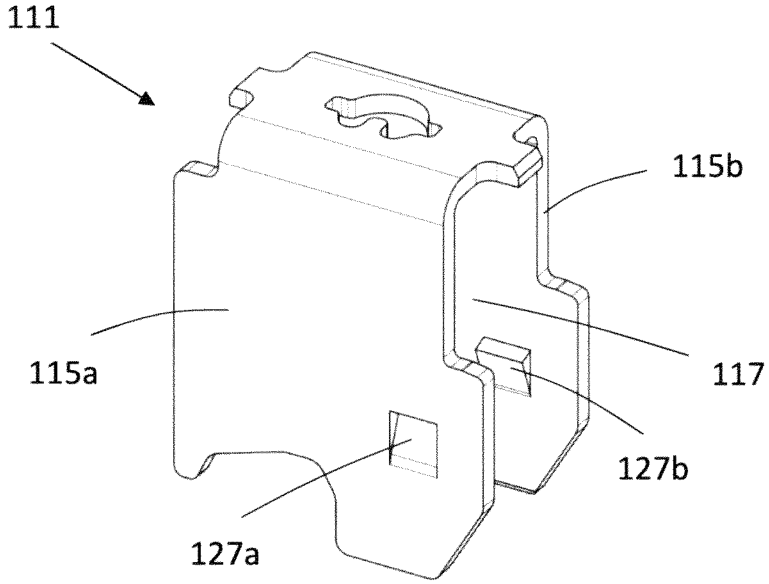
FIG. 12 shows a schematic representation of a second body element according to a further embodiment.
Figure 13:
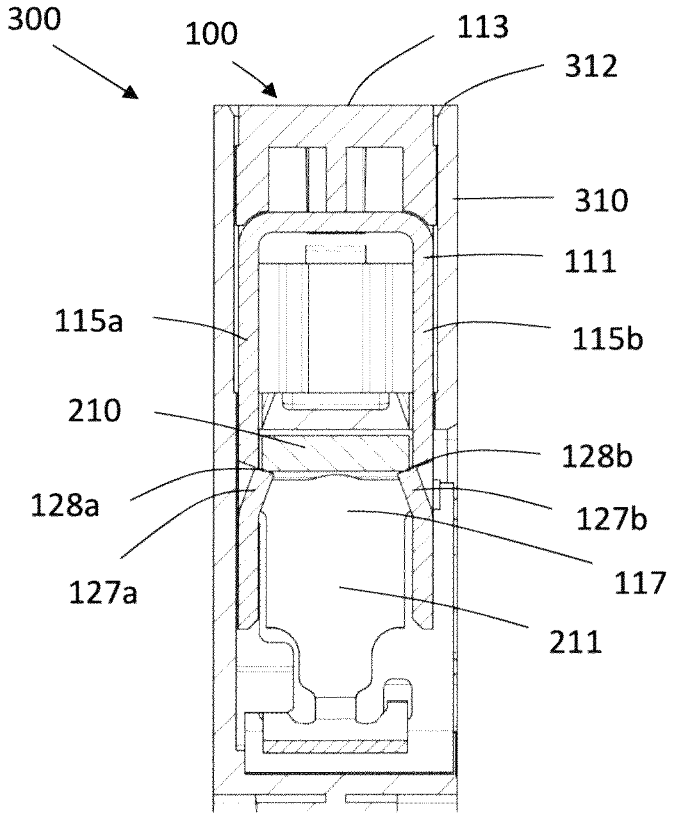
FIG. 13 shows a schematic sectional view of a connection terminal with a second body element as shown in FIG. 12.

In the embodiment shown in FIGS. 12 and 13, the two path limitation elements 127*a*, 127*b* are directed towards one another. The two path limitation elements 127*a*, 127*b* project into the free space 117 between the two actuating arms 115*a*. 115*b*.

As can be seen in the sectional view of FIG. 13, the counter stop surface is formed by the current bar 210 of the connection assembly 200. In the starting position, as shown in FIG. 13, the travel limitation elements 127*a*, 127*b* abut against the current bar 210 with their stop surfaces 128*a*, 128*b* in order to limit the actuating element 100 in its movement counter to the actuating direction B.

In both embodiments, the path limitation elements 127*a*, 127*b* are formed at one and the same height on the actuating arms 115*a*, 115*b* of the second body element 111.

A free space 117 is formed between the two actuating arms 115*a*, 115*b*, through which the current bar 210 is guided in the connection assembly 200 and into which the conductor 400 to be connected is inserted. The clamping of the conductor 400 to be connected against the current bar 210 therefore takes place in the region of the free space 117. The two actuating arms 115*a*, 115*b* can thereby form a lateral guide for the conductor 400 to be connected.

In a state mounted in the connection assembly 200, the actuating element 100 rests with the connecting web 116 on the current bar 210, and the two actuating arms 115*a*, 115*b* laterally overlap the current bar 210.

Figure 3:
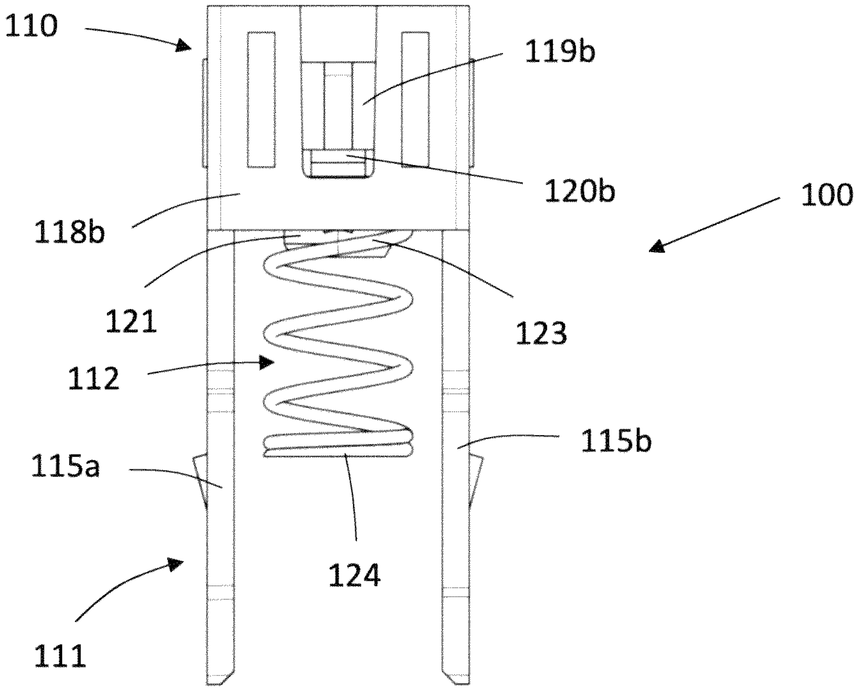
FIG. 3 shows a schematic representation of the actuating element in the pre-latched position in a transverse side view.
Figure 4:
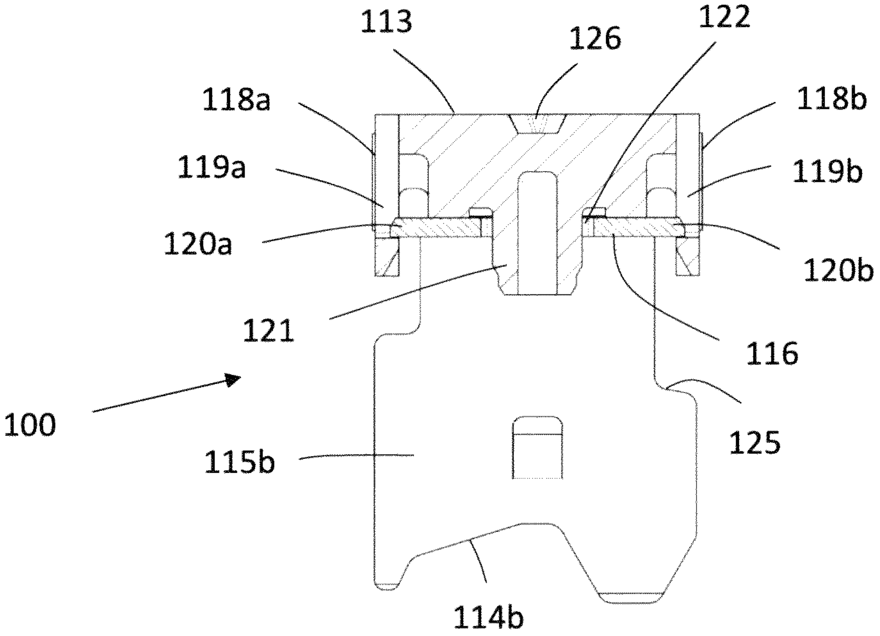
FIG. 4 shows a schematic sectional view of the actuating element shown in FIG. 3 in the pre-engagement position in a longitudinal side view.

Before the actuating element 100 is mounted in the connection assembly, the first body element 110 is pre-latched with the second body element 111. In this pre-latched position, the two body elements 110, 111 are connected to one another via a locking connection. In the pre-latched position as shown in FIGS. 3 and 4, the first body element 110 is latched to the second body element 111 via the connecting web 116 of the second body element 111. In the pre-latched position, the two body elements 110, 111 are arranged in a fixed position relative to one another.

The first body element 110 has two, opposing transverse side surfaces 118*a*, 118*b*. The two transverse side surfaces 118*a*, 118*b* each extend at a 90° angle to the gripping surface 113 of the first body element 110. The pre-latching of the first body element 110 to the second body element 111 occurs via the two transverse side surfaces 118*a*, 118*b*. An opening 119*a*, 119*b* is formed in each case in the two transverse side surfaces 118*a*, 118*b*. The two openings 119*a*, 119*b* are opposite one another.

Two, opposing latching elements 120*a*, 120*b* are formed on the second body element 111 and are hooked or latched in the two openings 119*a*, 119*b* in the pre-latched position, as can be seen in the sectional view of FIG. 4. The two latching elements 120*a*, 120*b* are formed on the connecting web 116. The two latching elements 120*a*, 120*b* are each designed in the form of a latching lug extending away from the connecting web 116. The two latching elements 120*a*, 120*b* extend in the plane of the connecting web 116, so that the two latching elements 120*a*, 120*b* each form a lateral extension of the connection web 116.

To form the pre-latched position, the first body element 111 is pushed with its two transverse side surfaces 118*a*, 118*b* onto the connecting web 116 and accordingly onto the first body element 110 until the latching elements 120*a*, 120*b* on the connecting web 116 can dip into the openings 119*a*, 119*b* formed in the transverse side surfaces 118*a*, 118*b*. In the pre-latched position as shown in FIGS. 3 and 4, the transverse side surfaces 118*a*, 118*b* of the first body element 110 accordingly overlap the connecting web 116 of the second body element 111.

The first body element 110 is also fastened to the second body element 111 via a fastening dome 121, which is formed on the first body element 110 and can dip into an opening 122 formed in the second body element 111.

The fastening dome 121 is formed here centered in the middle on the first body element 111. The fastening dome 121 is arranged in the middle between the two transverse side surfaces 118*a*, 118*b*.

The opening 122 is formed in the connecting web 116 of the second body element 111. The opening 122 is also formed centered in the middle on the connection web 116. In the pre-latched position, the fastening dome 121 is guided through the opening 122, as can be seen in FIG. 4.

The fastening dome 121 can be arranged with a press fit in the opening 122.

The spring element 112 can be fastened to the fastening dome 121, as can be seen in FIG. 3. FIG. 4 shows a sectional view without the spring element 112.

The spring element 112 is designed here in the form of a spiral spring which is pushed or plugged onto the outer peripheral surface of the fastening dome.

If the actuating element 100 is mounted in a connection assembly 200 as shown in FIGS. 5 through 8, the actuating element 100 is supported on the current bar 210 via the spring element 112. The actuating element 100 can be spring-loaded via the spring element 112 in the state mounted in the connection assembly 200. Before the actuating element 100 is mounted in the connection assembly 200, the spring element 112 is fastened to the first body element 110 via the fastening dome 121. The spring element 112 is designed as a compression spring.

With a first end 123, the spring element 112 is fastened to the fastening dome 121 and accordingly to the first body element 110. With a second end 124 opposite the first end 123, the spring element 112 rests against the current bar 210 and is supported against the current bar 210.

FIG. 9 shows an actuating element 100 which substantially corresponds to the embodiment shown in FIGS. 1 through 4, wherein the actuating element 100 shown in FIG. 9 does not have a spring element 112.

In the actuating element 100 shown in FIG. 10, a spring element 112 is also not provided, and the second body element 111 also has only one actuating arm 115*a* and accordingly also only one actuating surface 114*a*. Otherwise, the actuating element 100 shown in FIG. 10 likewise corresponds to the actuating element 100 shown in FIGS. 1 through 4.

FIGS. 5 through 8 shows a connection terminal 300 with a housing 310 within which a connection assembly 200 for connecting a conductor 400 is arranged. The housing 310 is preferably formed from an insulating material—for example, a plastic material. The connection assembly 200 is arranged in an interior of the housing 310.

Figure 5:
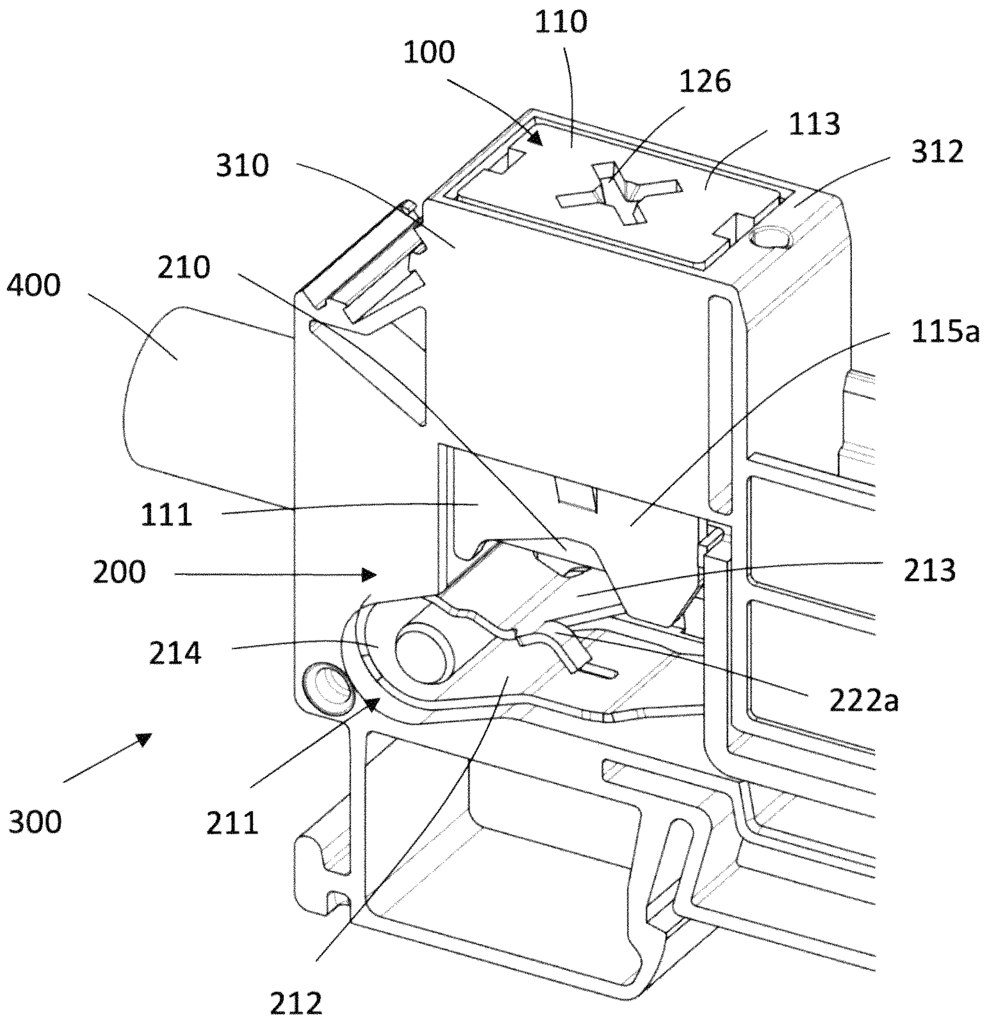
FIG. 5 shows a schematic representation of a connection assembly with an actuating element as shown in FIGS. 1 through 4 in a connection terminal with the clamping spring in the clamping position.
Figure 6:
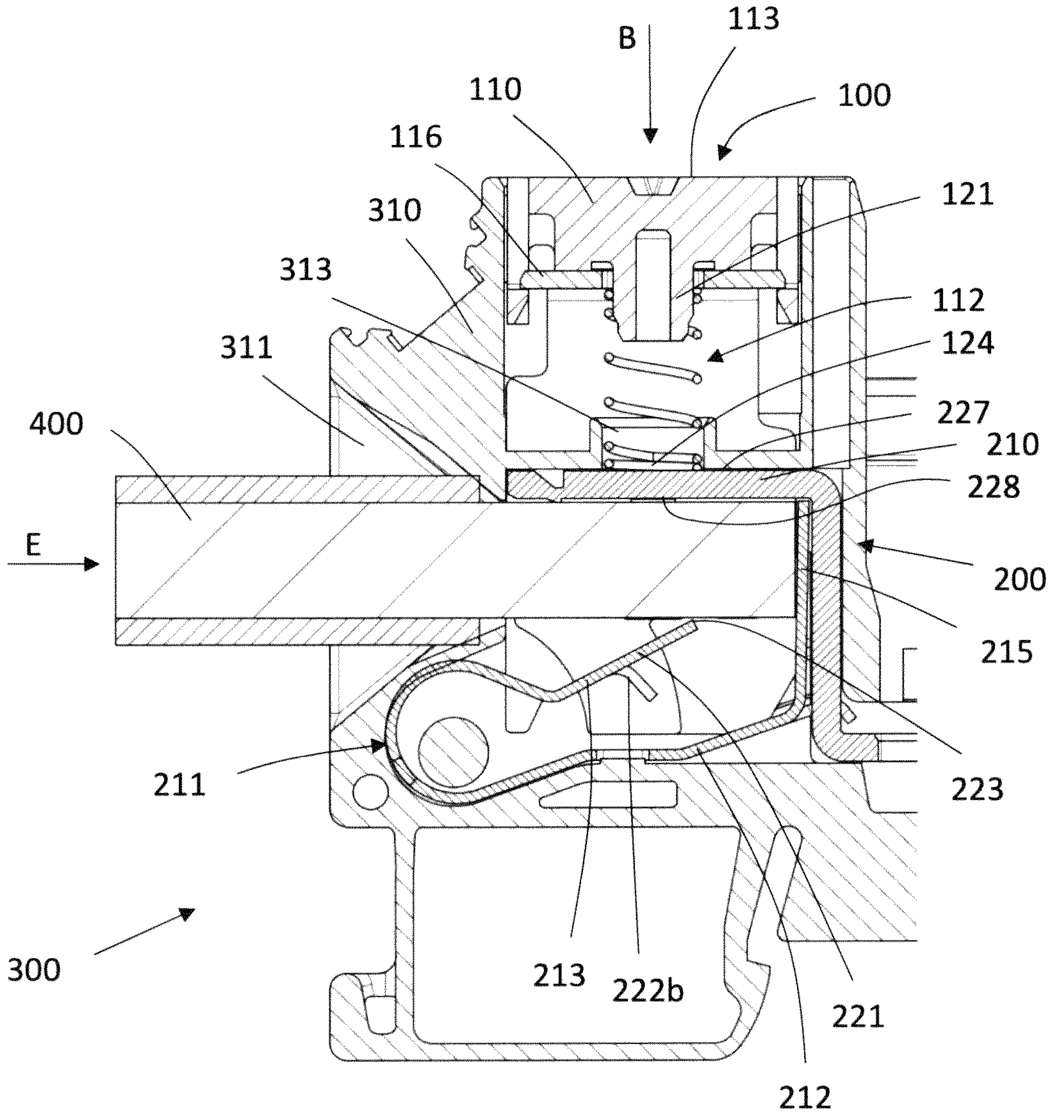
FIG. 6 shows a schematic sectional representation of the connection terminal shown in FIG. 5, with the clamping spring in the clamped position.

The connection assembly 200 has a current bar 210 and a clamping spring 211, wherein the conductor 400 to be connected can be electrically-conductively clamped against the current bar 210 by means of the clamping spring 211, as shown in FIGS. 5 and 6.

Figure 7:
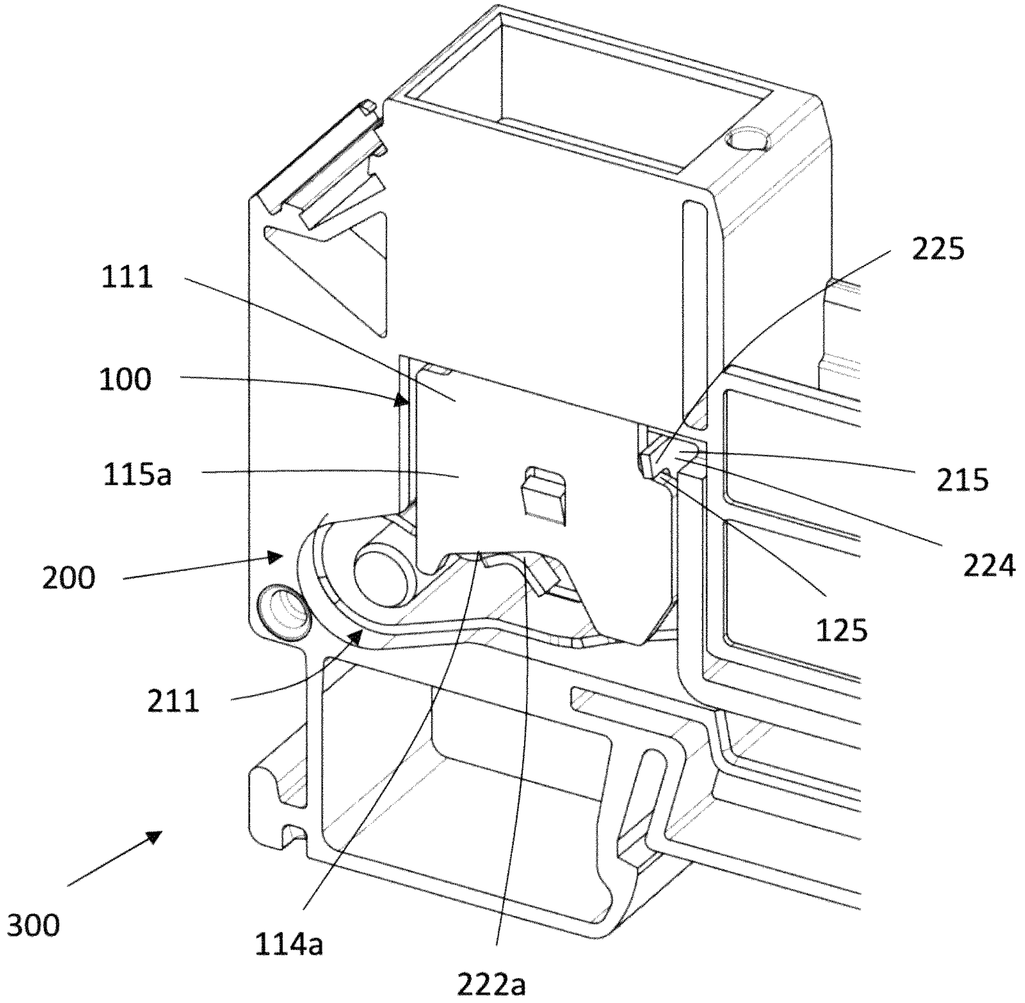
FIG. 7 shows a schematic representation of a connection terminal according to the invention with the clamping spring in an open position.
Figure 8:
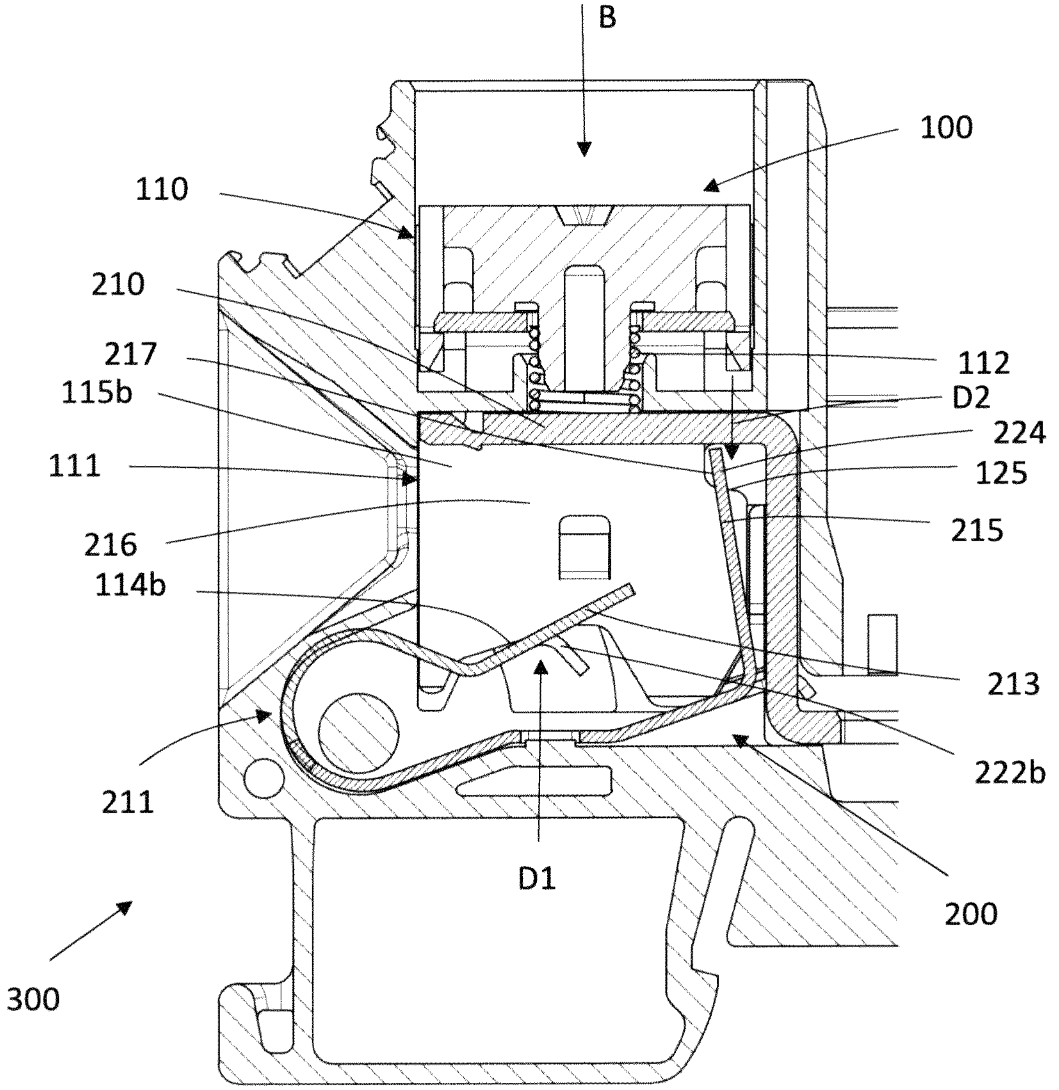
FIG. 8 shows a schematic sectional representation of the connection terminal shown in FIG. 7, with the clamping spring in an open position.

The clamping spring 211 is designed as a leg spring. The clamping spring 211 has a holding leg 212 and a clamping leg 213. The holding leg 212 and the clamping leg 213 are connected to one another via an arcuate portion 214. The holding leg 212 is arranged in the housing 310 in a fixed position. The clamping leg 213 is pivotable relative to the holding leg 212 so that, depending upon the position of the clamping leg 213, the clamping spring 211 can be transferred and positioned in an open position, as shown in FIGS. 7 and 8, and in a clamped position, as shown in FIGS. 5 and 6.

The clamping spring 211 also has a latching leg 215, so that the clamping spring 211 has three legs. The latching leg 215 is connected to the holding leg 212, so that the holding leg 212 is arranged between the clamping leg 213 and the latching leg 215. In the embodiment shown here, the latching leg 215 extends substantially at a right angle away from the holding leg 212. The latching leg 215 is designed long enough that it projects, starting from the holding leg 212, beyond the clamping leg 213, at least in the open position of the clamping spring 211. The latching leg 215 serves to help hold the clamping spring 211 in the open position.

The latching leg 215 extends, starting from the holding leg 212, in the direction of the conductor connection space 216, which is formed between the current bar 110 and the clamping spring 111, wherein the conductor 400 to be connected is inserted into this conductor connection space 216 in order to connect the conductor 400 and clamp it against the current bar 210. The latching leg 215 is designed long enough that it delimits the conductor connection space 216 in the conductor insertion direction E. If a conductor 400 is inserted into the conductor connection space 216 via a conductor insertion opening 311 formed on the housing 310, the conductor 400 abuts against the latching leg 215, as a result of which the latching leg 215 can be deflected or pivoted in the conductor insertion direction E.

The latching leg 215 has a pressure surface 217 which points in the direction of the conductor connection space 216 and against which the conductor 400 can abut during insertion into the conductor connection space 216. So that the latching leg 215 can be deflected, the latching leg 215 is connected resiliently to the holding leg 212.

In order to transfer the clamping spring 211 from the clamped position into the open position, the connection assembly 200 has the actuating element 100. The actuating element 100 is guided purely linearly in the housing 310. When the clamping spring 211 is actuated in order to transfer it from the clamped position into the open position, the actuating element 100 is moved in the actuation direction B, in which the actuating element 100 is moved in the direction of the clamping spring 211. The actuating element 100 interacts with the clamping leg 213 of the clamping spring 211 in that the actuating element 100 exerts a force in the actuation direction B on the clamping leg 213 via the actuating surfaces 114*a*. 114*b* of the second body element 111 of the actuating element 100, so that the clamping leg 213 is pivoted in the direction of the holding leg 212 in order to release the conductor connection space 216.

During a movement of the actuating element 100 in the actuating direction B. and accordingly during the transfer of the clamping spring 211 from the clamping position into the open position, the spring element 112 of the actuating element 100 is compressed and accordingly tensioned, as can be seen in FIG. 8. When the clamping spring 211 is transferred back from the open position into the clamping position, the spring force of the spring element 112 acts upon the actuating element 100 in such a way that the actuating element 100 is moved back by the spring element 112 counter to the actuating direction B independently of the position of the clamping leg 213 of the clamping spring 211, so that a defined position of the actuating element 100 is always achieved by means of the spring element 112 in a starting position of the actuating element 100, as shown in FIGS. 5 and 6, and accordingly in the clamping position of the clamping spring 211. This enables a clear visual display for a user that a conductor 400 is connected in the connection assembly 200 or in the connection terminal 300. In this starting position in the embodiment shown here, the actuating element 100 is arranged with its gripping surface 113 flush with an outer surface 312 of the housing 310 of the connection terminal 300, as shown in FIGS. 5 and 6.

For tilt-proof mounting of the spring element 112, an opening 313 is formed in the interior of the housing 310 of the connection terminal 300, into which opening the spring element 112 is inserted with its second end 124, as can be seen in FIG. 6, so that a defined contact of the spring element 112 by its second end 124 on the current bar 210 is ensured. The spring element 112 rests against a side surface 227 of the current bar 210, which is arranged opposite the surface 228 of the current bar 210 against which the conductor 400 to be connected is clamped.

The two actuating arms 115*a*, 115*b* of the second body element 111 of the actuating element 100 are designed long enough that they laterally delimit the conductor connection space 216 and accordingly can form a lateral guide for the conductor 400 to be connected.

With its two actuating surfaces 114*a*, 114*b*, the actuating element 100 rests on the clamping leg 213 of the clamping spring 211 when said clamping leg is transferred from the clamped position into the open position.

The clamping leg 213 has a clamping tab 221 and two side tabs 222*a*, 222*b* arranged laterally to the clamping tab 221. At its free end, the clamping tab 221 has a clamping edge 223, by means of which the conductor 400 to be connected is clamped against the current bar 210, as shown in FIG. 6.

The clamping tab 221 is arranged between the two side tabs 222*a*, 222*b*. The clamping tab 221 is longer than the two side tabs 222*a*, 222*b*, so that the clamping tab 221 extends beyond the two side tabs 222*a*, 122*b*. The two side tabs 222*a*, 222*b* each have an arcuate shape. The two side tabs 222*a*, 222*b* can accordingly each form a runner which can slide along the actuating surfaces 114*a*, 114*b* when interacting with the actuating element 100. For actuating the clamping spring 211 via its second body element 111, the actuating element 100 is accordingly in direct contact with the two side tabs 222*a*, 122*b* of the clamping spring 211, whereas the clamping tab 221 does not have direct contact with the actuating element 100. The clamping tab 221 is arranged or movable in the free space 117 formed between the two actuating arms 115*a*, 115*b*.

FIGS. 7 and 8 show the clamping spring 211 in the open position in which the conductor connection space 216 is released so that a conductor 400 to be connected can be inserted into the latter and also guided out of it again. In this open position, the clamping spring 211 and the actuating element 100 are braced with one another so that the clamping spring 211 and the actuating element 100 form a closed force system, in which the actuating element 100 is held in position by the clamping spring 211 without additional auxiliary means, and the clamping spring 211 is in turn held in position by the actuating element 100.

The actuating element 100 is braced with the clamping spring 211 in that, in the open position, the clamping spring 211 applies two, oppositely-acting pressure forces D1, D2 to the actuating element 100, and in particular to the second body element 111 of the actuating element 100. As a result of these two, oppositely-acting pressure forces D1, D2, the actuating element 100 and accordingly also the clamping spring 211 can be held in a stable, stationary position.

The first pressure force D1 acts upon the actuating element 100 counter to the actuation direction B. The first pressure force D1 is applied to the second body element 111 of the actuating element 100 by the clamping leg 213, and in particular by the side tabs 222*a*. 222*b* of the clamping leg 213. In the process, the side tabs 222*a*, 222*b* press on the actuating surfaces 114*a*, 114*b* of the second body element 111 of the actuating element 100 with the first pressure force D1 applied by the spring effect of the clamping leg 213.

The second pressure force D2 acts upon the actuating element 100 in the actuation direction B. The second pressure force D2 is applied by the latching leg 215 of the clamping spring 211 to the actuating element 100. The latching leg 215 is held with its free end 224 on the actuating element 100—in particular, on the two actuating arms 115*a*, 115*b* of the actuating element 100, and in particular latched on the actuating element 100. The free end 224 has a T-shape in that the free end 224 has two retaining arms 225 projecting laterally outwards. In the open position, the latching leg 215 is held to the first actuating arm 115*a* by one of the holding arms 225 and is held to the second actuating arm 115*b* by another holding arm 225.

In order to be able to ensure a positionally secure and accordingly defined holding of the latching leg 215 on the actuating element 100 in the open position, a holding contour 125 is formed on each of the two actuating arms 115*a*, 115*b*. The holding contour 125 is formed at a distance from the actuating surfaces 114*a*, 114*b* on the actuating element 100. In the open position, the two holding arms 225 of the latching leg 215 rest against the holding contour 125 of the actuating arms 115*a*, 115*b* in order to hold the latching leg 215 in a stationary position.

If, in the open position of the clamping spring 211, a conductor 400 to be connected is inserted into the conductor connection space 216 via the conductor insertion opening 311 of the housing 310 in the conductor insertion direction E, the conductor 400 abuts against the pressure surface 217, arranged flush with the conductor insertion opening 311, of the latching leg 215 of the clamping spring 211. By the conductor 400 abutting against the pressure surface 217, the latching leg 215 is pivoted in the conductor insertion direction E so that the latching leg 215 is brought out of engagement with the holding contour 125 of the actuating element 100.

As soon as the latching leg 215 is released from the actuating element 100, the bracing of the clamping spring 211 with the actuating element 100 is released, since the latching leg 115 no longer exerts a second pressure force D2 on the actuating element 100. Thus, only the first pressure force D1 applied by the clamping leg 213 to the actuating element 100 acts upon the actuating element 100, as a result of which the clamping leg 213 can displace the actuating element 100 upwards, counter to the actuation direction B, by the spring force of the clamping leg 213, as a result of which the clamping leg 213 also moves in the direction of the conductor 400 inserted into the conductor connection space 216 in order to press said conductor against the current bar 210 via the clamping tab 221 of the clamping leg 213, and accordingly clamp and connect the conductor 400 against the current bar 210. This clamped position of the clamping spring 211 is shown in FIGS. 5 and 6.

This makes it possible to connect and clamp a conductor 400, and in particular a conductor 400 with a small conductor cross-section, without additional assistance.

Here, the conductor 400 is inserted transversely to the actuation direction B of the actuating element 100 into the conductor connection space 216, and accordingly into the connection assembly 200 or into the connection terminal 300.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Actuating element
110 First body element
111 Second housing part
112 Spring element
113 Grip surface
114*a*, 114*b* Actuating surface
115*a*, 115*b* Actuating arm
116 Connecting web
117 Free space
118*a*, 118*b* Transverse side surface
119*a*, 119*b* Opening
120*a*, 120*b* Locking element
121 Fastening dome
122 Opening
123 First end
124 Second end
125 Holding contour
126 Tool receiving region
127*a*, 127*b* Path limitation element
128*a*, 128*b* Stop surface
200 Connection assembly
210 Current bar
211 Clamping spring
212 Holding leg
213 Clamping leg
214 Arcuate portion
215 Latching leg
216 Conductor connection space
217 Pressure surface
221 Clamping tab
222*a*, 222*b* Side tab
223 Clamping edge
224 Free end
225 Holding arm
227 Lateral surface
228 Surface
300 Connection terminal
310 Housing
311 Conductor insertion opening
312 Outer surface
313 Opening
314 Housing surface
400 Conductor
D1 First pressure force
D2 Second pressure force
B Actuation direction
E Conductor insertion direction

The invention claimed is:

1. An actuating element for actuating a clamping spring of a connection assembly, the actuating element comprising:
a first body element comprising a gripping surface for actuating the actuating element; and
a second body element comprising at least one actuating surface for actuating the clamping spring,
wherein the first body element is transferrable to a pre-latched position with the second body element before being mounted in the connection assembly,
wherein the first body element comprises a first material, and the second body element comprises a second material different from the first material, and
wherein the second material has a greater strength than the first material.

2. The actuating element of claim 1, wherein the first material comprises a plastic material, and the second material comprises a metal material.

3. The actuating element of claim 1, wherein, to form the pre-latched position, the first body element has two, mutually-opposing openings into which two, mutually-opposing latching elements formed on the second body element are latchable.

4. The actuating element of claim 1, wherein the second body element has at least one actuating arm and a connecting web formed transversely to the actuating arm, and wherein the at least one actuating surface is formed on the at least one actuating arm, and the second body element is pre-latched on the first body element in the pre-latched position via the connecting web.

5. The actuating element of claim 1, wherein, the second body element comprises a holding contour for holding a latching leg of a clamping spring of the connection assembly in an open position of the clamping spring.

6. The actuating element of claim 1, wherein the first body element has a fastening dome which, in the pre-latched position, is immersed in an opening formed on the second body element.

7. The actuating element of claim 1, further comprising:

a spring element which is arranged on a fastening dome of the first body element, wherein, in an assembled state of the fastening element, the spring element is supported against a stop surface of the connection assembly or against a stop surface of a connection terminal in which the connection assembly is arranged.

8. The actuating element of claim 1, wherein the first body element is connectable to the second body element by a force-fitting and/or integrally-bonded connection after being transferred into the pre-latched position.

9. The actuating element of claim 1, wherein the second body element has at least one path limitation element.

10. A connection assembly for connecting an electrical conductor, the connection assembly comprising:

a current bar;

a clamping spring, which has a holding leg and a clamping leg, the clamping leg being configured to clamp the electrical conductor, in a clamped position of the clamping spring, against the current bar; and the actuating element of claim 1, the actuating element being guidable along an actuation direction and by which the clamping spring is transferrable from the clamped position into the open position.

11. The connection assembly of claim 10, wherein the actuating element is supported by a spring element thereof on the current bar.

12. The connection assembly of claim 10, wherein the actuation direction is transverse to a conductor insertion direction of the electrical conductor to be connected into a conductor connection space formed between the current bar and the clamping spring.

13. A connection terminal, comprising:

a housing; and at least one connection assembly of claim 10 arranged in the housing.

14. An electronic device, comprising:

at least one connection assembly of claim 10; and/or at least one connection terminal, comprising:

a housing; and at least one connection assembly of claim 10 arranged in the housing.

15. The connection assembly of claim 10, wherein the actuating element with its second body element is braced with the clamping spring in the open position of the clamping spring as a bracing, and is configured to hold the clamping spring in the open position.

16. The connection assembly of claim 15, wherein, to form the bracing, the clamping spring, in the open position, is configured to apply a first pressure force acting counter to the actuation direction and a second pressure force acting in the actuation direction to the second body element of the actuating element.

17. The connection assembly of claim 16, further comprising:

a latching leg arranged on the holding leg, wherein, in the open position, the latching leg is configured to apply the second pressure force to the actuating element.

18. The connection assembly of claim 17, wherein the latching leg has a pressure surface, wherein, to transfer the clamping spring from the open position into the clamped position, the pressure surface is actuatable by the electrical conductor and is configured to come out of engagement with the actuating element by actuating the pressure surface of the latching leg.

19. A method for mounting a connection terminal, comprising:

providing a first body element of an actuating element comprising a gripping surface for actuating the actuating element;

providing a second body element of the actuating element comprising at least one actuating surface for actuating the clamping spring; and transferring the first body element and the second body element to a pre-latched position with each other prior to mounting the first body element and the second body element in a housing of the connection terminal, wherein the first body element comprises a first material, and the second body element comprises a second material different from the first material, and wherein the second material has a greater strength than the first material.

20. An actuating element for actuating a clamping spring of a connection assembly, the actuating element comprising:

a first body element comprising a gripping surface for actuating the actuating element; and a second body element comprising at least one actuating surface for actuating the clamping spring, wherein the first body element is transferrable to a pre-latched position with the second body element before being mounted in the connection assembly, and wherein, to form the pre-latched position, the first body element has two, mutually-opposing openings into which two, mutually-opposing latching elements formed on the second body element are latchable.

* * * * *